United States Patent [19]

Nenstiel

[11] Patent Number: 5,253,695
[45] Date of Patent: Oct. 19, 1993

[54] VEHICLE VISOR SUPPORTED INTERIOR CURTAIN

[76] Inventor: Frank S. Nenstiel, P.O. Box 91222, Long Beach, Calif. 90809-1222

[21] Appl. No.: 961,493

[22] Filed: Oct. 19, 1992

Related U.S. Application Data

[63] Continuation-in-part of Ser. No. 765,666, Sep. 26, 1991, abandoned.

[51] Int. Cl.$^5$ ................................................ B60J 3/00
[52] U.S. Cl. .............................. 160/370.2 R; 160/105
[58] Field of Search ............... 160/370.2, 105, DIG. 2, 160/DIG. 3; 296/95.1, 96, 97.7, 97.8, 97.9

[56] References Cited

U.S. PATENT DOCUMENTS

| | | | |
|---|---|---|---|
| 2,821,248 | 1/1958 | Irvine | 296/95.1 X |
| 2,979,129 | 4/1961 | Ketchum | 296/95.1 X |
| 4,746,162 | 5/1988 | Maness | 160/DIG. 3 X |
| 4,838,334 | 6/1989 | Hogg et al. | 160/370.2 |
| 4,862,943 | 9/1989 | Shafia | 160/370.2 |

Primary Examiner—David M. Purol

[57] ABSTRACT

A light blocking interior curtain for a vehicle windshield and side door windows that requires no periphery hardware or other fasteners that attach to the vehicle interior. The device is made of a flexible curtain material which covers the windshield and side door windows. The material covering the windshield portion, forms two horizontally aligned slits which allow the vehicle's existing sun visors to pass through and support the curtain. The slits are fitted with a visor pocket structure that encloses the sun visor and provides added support and strength to the curtain. The end portions of the curtain are fitted with horizontal protrusions attached to the outside facing surface and provide support for the side door window portion when held firmly between the glass and the door frame when the window is raised. To reduce the tendency of the material to sag between the visor supported areas, a tension adjusting feature is provided using touch fastener material attached to the curtain generally between horizontal slits and on the inside facing surface.

2 Claims, 4 Drawing Sheets

VEHICLE VISOR SUPPORTED INTERIOR CURTAIN

CROSS-REFERENCES TO RELATED APPLICATIONS

This application is a continuation-in-part of pending prior application Ser. No. 07/765,666 filed on Sep. 26, 1991 now abandoned.

BACKGROUND OF THE INVENTION

1. Field of Invention

The invention relates generally to an interior light blocking and privacy curtain for a vehicle windshield and side door windows.

2. Description of Prior Art

There are many devices available for blocking light entry into a vehicle. A popular design by Abraham Levy, U.S. Pat. No. 4,202,396, describes a foldable sunshade of rigid cardboard material, but has a loose fit, and is cumbersome to handle and hard to store. A similar device is U.S. Pat. No. 4,838,334 by J. S. Hogg that provides holes in the device to enable an occupant to see out without disturbing the shade. Other variations of flexible shade panels have been developed using drawstrings for all borders, or for only horizontal and vertical adjustments as with F. Shafia U.S. Pat. No. 4,862,943. The prior art must rely on some sort of miscellaneous fixture attached to the interior of the vehicle around the perimeter of the window being covered. A semi-rigid design as patented to E. B. White, U.S. Pat. No. 5,016,937, must rely on two stiff but flexible rods with shade material attached between the upper and lower rods with the lower rod attaching to the dashboard via a suitable fastener and then pulling the upper rod with material attached to a prepositioned hook device at the upper border of the windshield. This device is also cumbersome to store and does not cover side windows. It also requires attachment of undesirable fasteners to the interior of the vehicle. U.S. Pat. No. 4,759,581 granted to T. C. McNamee, explains an arrangement of various flexible plies that, when attached to the windshield, will reduce incoming light, and if privacy is desired, a second ply of opaque material that is hinged along its lower edge, is brought up to covers the first ply. This device also requires modification to dashboard and windshield area, and does not afford coverage to side windows. U.S. Pat. No. 4,109,957 by J. R. Polizzi, describes a quickly removable curtain for covering the interior side of a vehicle windshield. This device utilizes a plurality of snap fasteners screwed to structural portions of interior, and transparent suction cups on other areas.

Repeatedly, the positive features of these devices depend upon the use of items not consistent with modern refined and advanced vehicle interiors. Suction cup devices may not impair vision, but their presence is not complimentary to the clean lines of the windshield. Also, the additional hardware is difficult to clean around and suction cup devices do not adhere to most modern textured plastics present in today's vehicles.

It is an object of the invention to eliminate the need to burden the vehicle interior with unsightly and objectionable mechanical fastening devices.

An additional object of this invention is to eliminate permanently mounted hardware that could be hazardous in an accident such as metal fasteners, hooks, rods, etc.

A further object of this invention is to provide a curtain intended for ease of use and storage. The curtain can be folded, rolled, or stuffed into a sack or convenient area.

Still another object of the invention is to permit the use of a curtain in a vehicle that does not allow modifications to be made to the interior, such as a rental vehicle.

A further object of this invention is to provide a curtain for the large truck cab which has a windshield perimeter dimension that will not accommodate fasteners, or is prohibited from the use of fasteners or any device attached to the windshield which would be an obstruction to the driver's view.

BRIEF SUMMARY OF THE INVENTION

The invention provides a light blocking curtain that covers the interior side of a vehicle windshield and the side door windows. The curtain is held in relation to the vehicle windshield by passing the vehicle's existing interior sun visors through two horizontally aligned slits which are fabricated into the curtain material. The curtain is supported by the visors when they are in the up position. A visor-pocket structure at the slits provide added support and strength to the curtain.

The end portions of the curtain are fitted with horizontal protrusions attached to the outside facing surface of the curtain material. The protrusions are designed to support the side door window portion of the curtain by placing the protrusion on the top edge of the window glass and then raising the window to hold the protrusion between the top of the glass and the door frame.

The adjusting means is provided generally between the horizontal slits, and is centered on the curtain's inside facing surface. The adjustment means is of the touch fastener type, (one version is commonly known as "Velcro"), with a strip of touch fastener part one attached to the curtain material and a pull tab of touch fastener part two attached to one end of the strip. This adjusting means will reduce the sagging tendency of the curtain by providing tension between the visors.

DESCRIPTION OF PREFERRED EMBODIMENT

Figure 1:
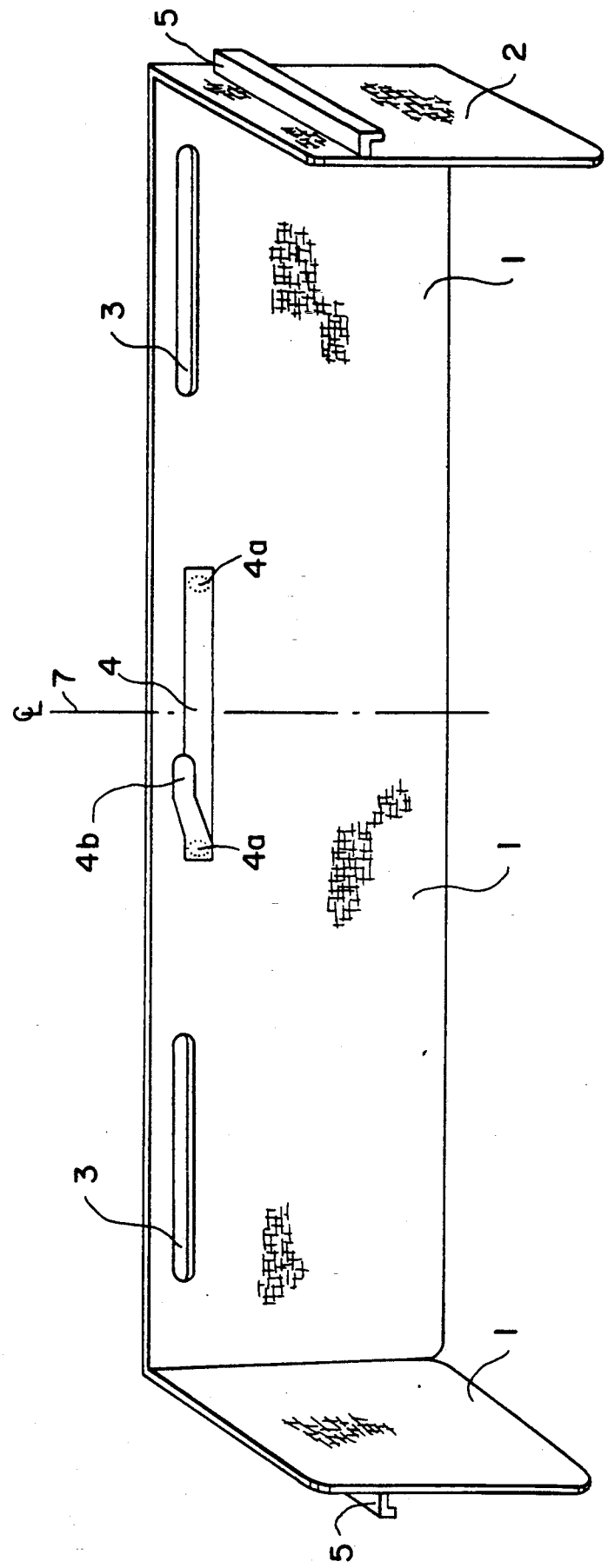
FIG. 1 is an oblique view of the device showing positioning of the horizontally aligned slits, the adjusting means and pull tab at their attachment points on the inside facing surface, and the horizontal protrusions attached to the outside facing surfaces of the end portions.
Figure 2:
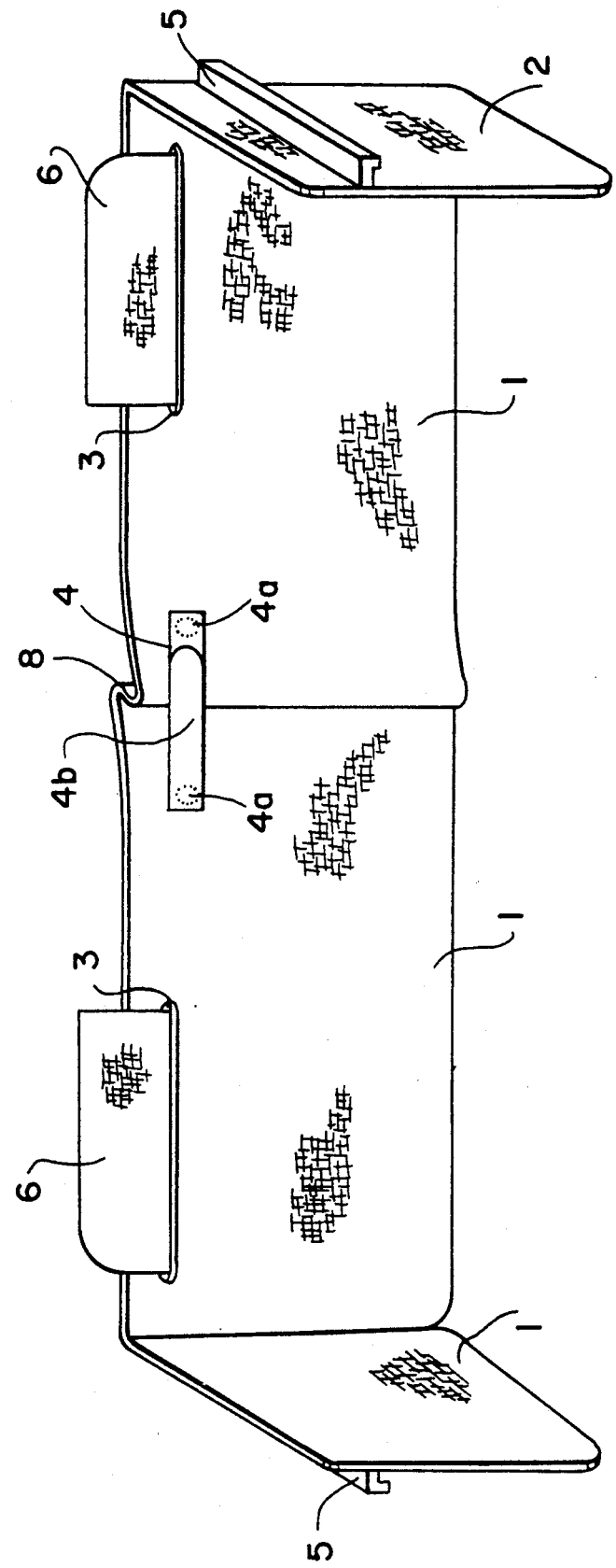
FIG. 2 is an ablique view of the device showing the existing vehicle sun visors through the horizontal slits and turned to the up position to support the curtain. The adjustment means pull tab has been pulled and press-fastened near the right attachment point to increase tension in the curtain while forming a pleat between the visors.
Figure 3:
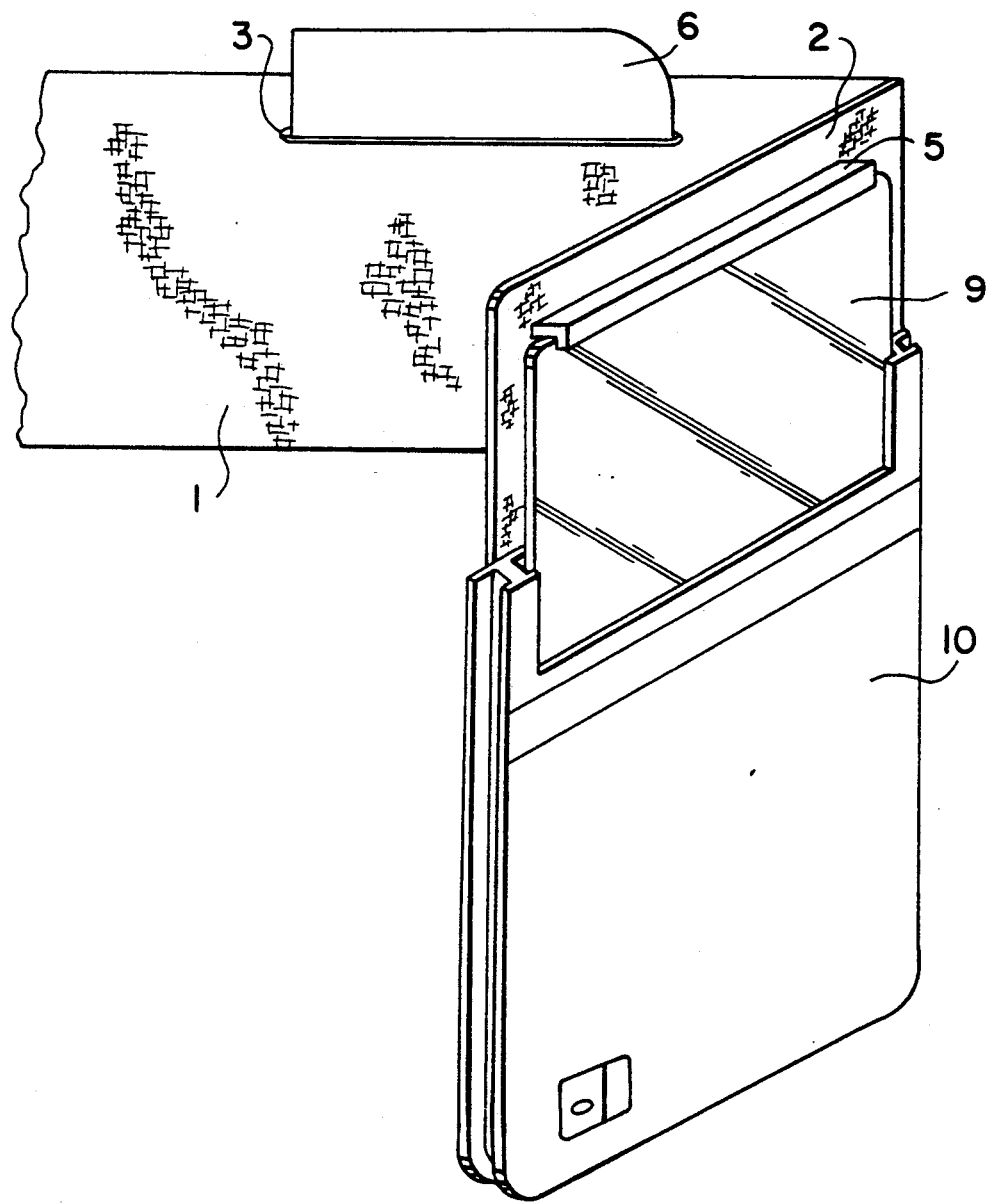
FIG. 3 is an oblique view of the device showing the right end portion being supported by the horizontal protrusion resting on the top of the side door window glass. The cut-away side door more clearly shows the relationship of the curtain material to the side door window, and the placement of other related items.
Figure 4:
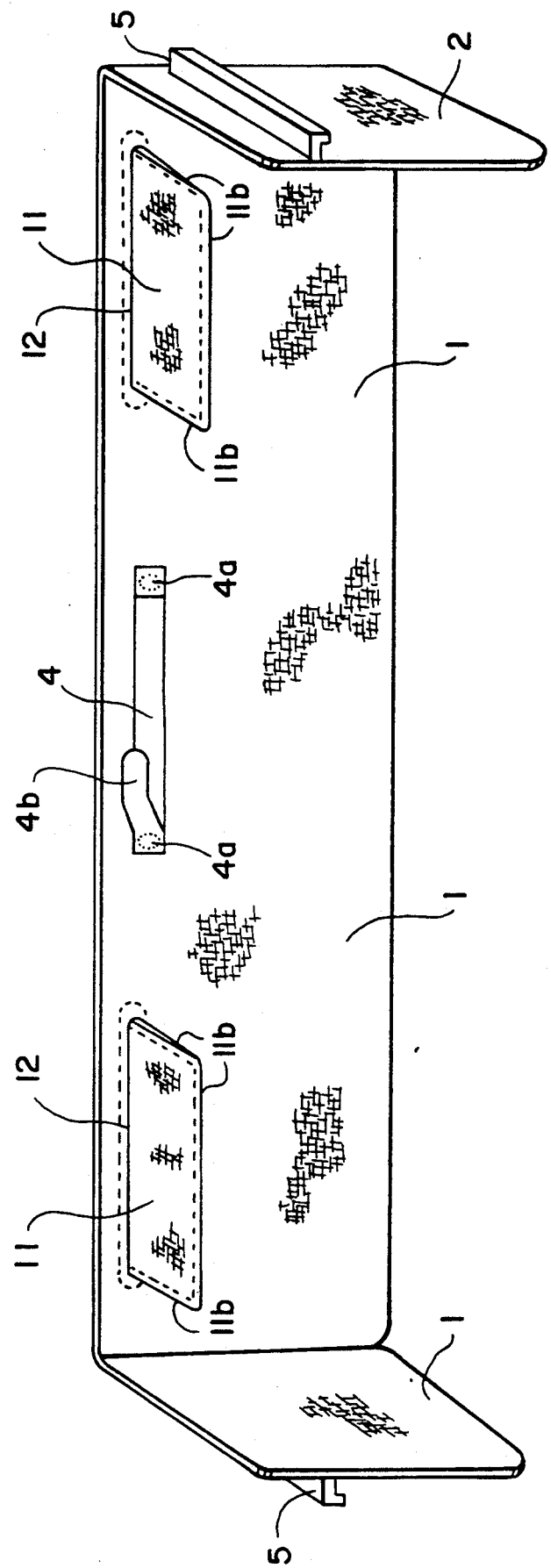
FIG. 4 is an oblique view of the device illustrating the visor-pocket structure attached to the perimeter of the horizontal slits.

A preferred embodiment of the present invention is explained by referring to FIGS. 1–4. FIG. 1 shows a full width view of a light blocking interior curtain for a vehicle windshield and side door windows, with two horizontally aligned slits 3 positioned equal distance from the vertical centerline 7, and below the top portion of the curtain material. (Item 7 is shown in FIG. 1 only.) Horizontal slits 3 will allow the existing vehicle sun visors 6, as shown in FIG. 2 and 3, to pass through the curtain material and provide support for the windshield portion of the curtain when the visors are in the up position. The end portions as illustrated in FIGS. 1–4 have a horizontal protrusion 5 affixed to the outside facing surface 2. The horizontal protrusion 5 provides support for the side door window portion of the curtain. Illustrated in FIG. 3, a cut-away door 10 is used to clearly show the end portion being supported by the horizontal protrusion 5 as it rests on the top edge of the side door window glass 9 which is in the raised position. For additional support of the windshield portion of the curtain and to provide clean lines to the device when installed, the visor pocket structure 11, illustrated in FIG. 4, comprises a pocket that is closed on three ends 11b with the fourth end remaining open and permanently attached 12 to the perimeter of the horizontal slit 3. To avoid sagging between the supporting areas of the curtain which is intended for the wide cabs of large trucks, a tension adjusting means is needed. Any number of methods can be used. The preferred means as shown in FIG. 1, 2 and 4 comprise a length of common touch fastener material part one 4 that is positioned horizontally on the inside facing surface 1, and which spans across the vertical centerline 7 attaching at each end 4a. The attach points are equal distance from vertical centerline 7 and generally between horizontal slits 3. A pull tab of touch fastener material part two 4b is attached to one of the attach points 4a. FIG. 1 shows the adjustment means pull tab 4b in the unadjusted position. FIG. 2 shows the adjusting means pull tab 4b in the adjusted position with the tab pulled closer to the right hand attach point 4a, resulting in vertical pleat 8 in the curtain material. The device is operated by simply pulling down the vehicle sun visors 6 to mid position and sliding the visor pocket structure 11 over the sun visors 6. The visors 6 are then returned to their up position. The end portion horizontal protrusions 5 are placed on the top edge of the side door glass and the windows raised to hold the protrusion. The tension on curtain can be adjusted as needed. The procedure to remove the device is simple and quick. The side windows are rolled slightly down and the protrusion 5 removed from the top of the window. The visors 6 are pulled down and the pockets 11 are removed. The curtain is now ready to fold, roll or stuff into a convenient place.

I claim:

1. A light blocking interior curtain for a vehicle windshield and side door windows comprising:
    a light blocking flexible curtain material having a top portion, a bottom portion, and two end portions;
    two horizontally aligned slits defining a perimeter and being disposed in said curtain material below said top portion and positioned an equal distance about a vertical centerline thereof, said horizontally aligned slits receiving sun visors associated with said vehicle windshield for supporting said curtain material;
    each of said end portions having disposed thereon on an outside facing surface thereof an elongated L-shaped channel member, said L-shaped channel members receiving an upper edge portion of said side door windows for supporting said curtain material;
    tension adjusting means comprising a first strip of touch fastener material secured horizontally on an inside facing surface thereof of said curtain material and spanning across said vertical centerline, and a second strip of touch fastener material secured to an end thereof of said first strip thereby forming a pull tab.

2. The light blocking interior curtain of claim 1 further comprising a visor pocket structure including a pocket closed on three ends with a fourth end thereof being open and secured about the perimeter of said slits.

* * * * *